(12) United States Patent
Mellor

(10) Patent No.: US 9,588,675 B2
(45) Date of Patent: Mar. 7, 2017

(54) DOCUMENT SCALE AND POSITION OPTIMIZATION

(71) Applicant: Google Inc., Mountain View, CA (US)

(72) Inventor: John François Julien Mellor, London (GB)

(73) Assignee: Google Inc., Mountain View, CA (US)

( * ) Notice: Subject to any disclaimer, the term of this patent is extended or adjusted under 35 U.S.C. 154(b) by 560 days.

(21) Appl. No.: 14/058,163

(22) Filed: Oct. 18, 2013

(65) Prior Publication Data

US 2014/0281933 A1 Sep. 18, 2014

Related U.S. Application Data

(60) Provisional application No. 61/798,429, filed on Mar. 15, 2013.

(51) Int. Cl.
| | | |
|---|---|---|
| *G06F 17/25* | (2006.01) | |
| *G06F 3/0488* | (2013.01) | |
| *G06F 17/30* | (2006.01) | |
| *G06F 3/0483* | (2013.01) | |
| *G06F 3/0485* | (2013.01) | |

(52) U.S. Cl.
CPC ........ *G06F 3/04883* (2013.01); *G06F 3/0483* (2013.01); *G06F 3/0485* (2013.01); *G06F 17/30899* (2013.01); *G06F 17/30905* (2013.01); *G06F 2203/04806* (2013.01)

(58) Field of Classification Search
CPC ..... G06F 17/30899; G06F 2203/04806; G06F 3/0483; G06F 3/0485; G06F 3/04883; G06F 17/30905
See application file for complete search history.

(56) References Cited

U.S. PATENT DOCUMENTS

| | | | |
|---|---|---|---|
| 6,636,235 B1 | 10/2003 | Cooper et al. | |
| 6,915,484 B1 | 7/2005 | Ayers et al. | |
| 9,310,993 B2 * | 4/2016 | Choi | G06F 3/0482 |
| 9,311,750 B2 * | 4/2016 | Moore | G06T 19/00 |

(Continued)

FOREIGN PATENT DOCUMENTS

| | | | | |
|---|---|---|---|---|
| KR | 20110061433 A | * | 6/2011 | |
| KR | WO 2013027983 A2 | * | 2/2013 | G06F 3/03547 |

OTHER PUBLICATIONS

"Rotation and Scaling Using Multi Touch in Android", StackOverflow, Jun. 15, 2012, http://stackoverflow.com/questions/8515709/rotation-and-scaling-using-multi-touch-in-android, pp. 3.*

(Continued)

*Primary Examiner* — Chau Nguyen
(74) *Attorney, Agent, or Firm* — McDermott Will & Emery LLP

(57) ABSTRACT

Methods for optimizing a scale and position of a document in response to a user input is provided are provided. In one aspect, a method includes receiving an initial input request to scroll a document to a target position of the document, and identifying at least one relevant portion of content at or near the target position of the document. The method also includes adjusting a position and scale of the document while receiving the initial input request to an optimal position and an optimal scale for viewing the at least one relevant portion. Systems and machine-readable media are also provided.

12 Claims, 11 Drawing Sheets

(56) References Cited

U.S. PATENT DOCUMENTS

| | | | |
|---|---|---|---|
| 9,389,774 B2* | 7/2016 | Sogo | G06F 3/04845 |
| 2004/0177323 A1 | 9/2004 | Kaasila et al. | |
| 2009/0097750 A1* | 4/2009 | Tamaru | G06F 17/214 |
| | | | 382/176 |
| 2009/0189920 A1* | 7/2009 | Chiu | G06K 9/00456 |
| | | | 345/662 |
| 2010/0088641 A1* | 4/2010 | Choi | G06F 3/0482 |
| | | | 715/828 |
| 2010/0229115 A1* | 9/2010 | Augustine | G06F 3/1454 |
| | | | 715/800 |
| 2010/0283743 A1* | 11/2010 | Coddington | G06F 3/0485 |
| | | | 345/173 |
| 2011/0102455 A1* | 5/2011 | Temple | G06F 3/017 |
| | | | 345/619 |
| 2011/0169748 A1 | 7/2011 | Tse et al. | |
| 2012/0084703 A1* | 4/2012 | Lee | G06F 3/0483 |
| | | | 715/776 |
| 2012/0254793 A1* | 10/2012 | Briand | G06F 3/048 |
| | | | 715/800 |
| 2012/0299847 A1* | 11/2012 | Kwon | G06F 9/441 |
| | | | 345/173 |
| 2012/0306930 A1* | 12/2012 | Decker | G06F 3/0484 |
| | | | 345/667 |
| 2012/0311435 A1* | 12/2012 | Weeldreyer | G06F 3/0488 |
| | | | 715/243 |
| 2012/0313858 A1* | 12/2012 | Park | G06F 3/0238 |
| | | | 345/171 |
| 2013/0044141 A1 | 2/2013 | Markiewicz et al. | |
| 2013/0050269 A1* | 2/2013 | Arrasvuori | G06T 3/0025 |
| | | | 345/661 |
| 2013/0067400 A1 | 3/2013 | Jitkoff et al. | |
| 2013/0111332 A1* | 5/2013 | Davis | G06F 3/0488 |
| | | | 715/247 |
| 2013/0326425 A1* | 12/2013 | Forstall | G06F 3/04815 |
| | | | 715/851 |
| 2013/0335339 A1* | 12/2013 | Maunder | G06F 3/0488 |
| | | | 345/173 |
| 2014/0267079 A1* | 9/2014 | Duplan | G06F 3/04883 |
| | | | 345/173 |

OTHER PUBLICATIONS

New Features—Using touch gestures with your SMART Board interactive display frame or SMART Board 6052i interactive display, 2009-2010, SMART Technologies ULC, pp. 16.*

Martinez, "What is Text Reflow?" eHow. retrieved Mar. 28, 2013, retrieved from <http://www.ehow.com/info_12206498_text-reflow.html>.

"Opera Browser—Download Opera Mini'," retrieved Mar. 28, 2013, Opera Software ASA, retrieved from <http://www.opera.com/mobile/mini>.

"Font Inflation, Fennec and You", The Nothingness of Scott, posted Jul. 30, 2012, retrieved from <http://jwir3.wordpress.com/2012/07/30/font-inflation-fennec-and-you>.

Baron, "Improving font size readability on Firefox for Android," David Baron's Weblog, posted Nov. 26, 2011, retrieved from <http://dbaron.org/log/20111126-font-inflation>.

"Bug 84186—Text Autosizing for mobile browsers (master bug)", modified Feb. 15, 2013, retrieved from <https://bugs.webkit.org/show_bug.cgi?id=84186>.

Mellor, "Feature announcement: Font Boosting," Webkit, posted Apr. 17, 2012, retrieved from <http://mac-os-forge.2317878.n4.nabble.com/Feature-announcement-Font-Boosting-td172043.html>.

\* cited by examiner

DOCUMENT SCALE AND POSITION OPTIMIZATION

CROSS-REFERENCE TO RELATED APPLICATIONS

The present application claims the benefit of priority under 35 U.S.C. §119 from U.S. Provisional Patent Application Ser. No. 61/798,429 entitled "Document Scale And Position Optimization," filed on Mar. 15, 2013, the disclosure of which is hereby incorporated by reference in its entirety for all purposes.

BACKGROUND

Field

The present disclosure generally relates to the transmission of data over a network, and more particularly to the use of a computing device to provide for display data communicated over a network.

Description of the Related Art

Portable electronic devices often have a limited viewing region (or "viewport") within which to display content. Due to the relatively large amount of content for display in a document or other file, typically a portion of the content in the document may be displayed within the viewport while the remaining content of the document remains outside of the viewport. Alternatively, to display all of the content of the document, the document may be scaled to a very small degree in order to fit within the viewport. As a result, a user viewing the content will need to scroll (or "pan") or scale (or "zoom") the document to view content currently outside the viewport, or content within the viewport that is difficult to read. It is, however, often very difficult for the user to accurately scroll or scale the document to an optimal scale and position to view content the user intends to view. This difficulty is exacerbated when the document to view includes content having different optimal scales and positions.

SUMMARY

According to one embodiment of the present disclosure, a computer-implemented method for optimizing a scale and position of a document in response to a user input is provided. The method includes receiving an initial input request to scroll a document to a target position of the document, and identifying at least one relevant portion of content at or near the target position of the document. The method also includes adjusting a position and scale of the document while receiving the initial input request to an optimal position and an optimal scale for viewing the at least one relevant portion.

According to another embodiment of the present disclosure, a system for optimizing a scale and position of a document in response to a user input is provided. The system includes a memory that includes a document for display, and a processor. The processor is configured to execute instructions to receive an initial input request to scroll the document to a target position of the document, and identify at least one relevant portion of content at or near the target position of the document. The processor is also configured to execute instructions to provide, for display, a visual identification of the at least one relevant portion while receiving the initial input request, and adjust a position and scale of the document while receiving the initial input request to an optimal position and an optimal scale for viewing the at least one relevant portion.

According to a further embodiment of the present disclosure, a machine-readable storage medium includes machine-readable instructions for causing a processor to execute a method for optimizing a scale and position of a document in response to a user input is provided. The method includes receiving an initial input request to scroll a document to a target position of the document, and identifying at least one relevant portion of content at or near the target position of the document. The method also includes adjusting a position and scale of the document while receiving the initial input request to an optimal position and an optimal scale for viewing the at least one relevant portion, and receiving a further input request includes a distance by which to scroll the document from the optimal position, wherein a single touch and drag input request includes the initial input request and the further input request. When a threshold portion of the distance is not exceeded by the further input request, the method includes maintaining the document in the optimal position and at the optimal scale when receiving the further input request. When the threshold portion of the distance is exceeded by the further input request, the method includes adjusting the position and scale of the document to a non-optimal position for viewing the at least one relevant portion in response to the further input request.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
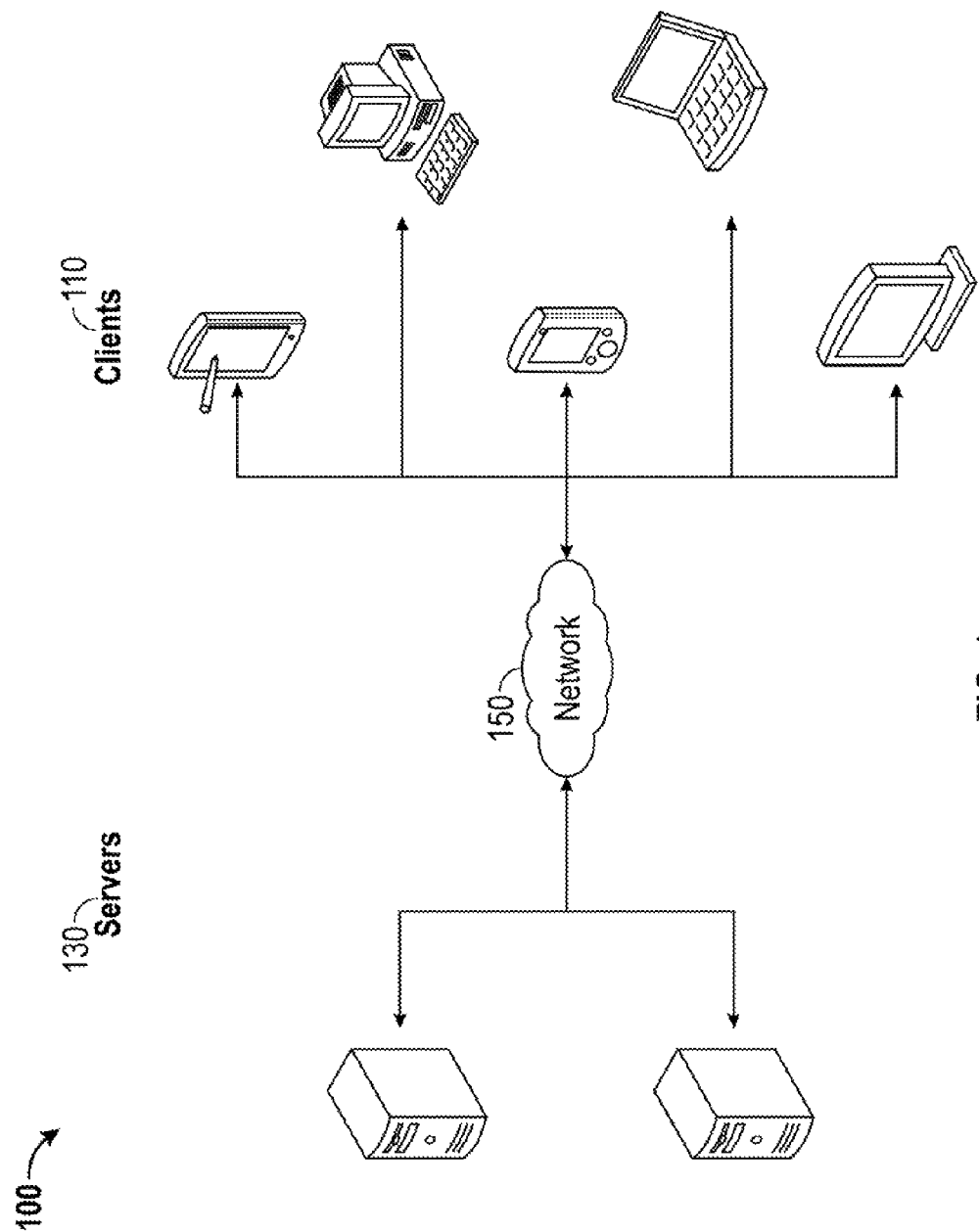
FIG. 1 illustrates an example architecture for optimizing a scale and position of a document in response to a user input.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system facilitates a user's ability to scroll or scale a document to view intended content in the document by predicting content or groups of content the user would view. The system then both scrolls and scales the document to an optimal level to view the content, as well as restrains (but does not preclude) the user from scrolling and scaling the document to a non-optimal position and scale. Specifically, the disclosed system identifies relevant content within a document. The identification may occur before or after receiving an initial input request from the user to scroll or scale the document.

If the initial input request is for scaling the document at or near a portion of the document, then relevant identified content at least partially within the portion of the document based on the input request is determined. The document is scaled during the initial input request to an optimal scale and position to view the relevant identified content. If the initial input request is for scrolling the document to a target portion of the document, then relevant identified content at least partially within the target portion of the document is determined. For either a scaling input request or a scrolling input request, the document is scaled and scrolled during the initial input request to an optimal scale and position to view the relevant identified content. In both instances, the disclosed system may, for example, provide graphical feedback to indicate to the user that an optimal scale and position has been reached. The graphical feedback can be, for example, shadowing, a change of color, a change of gradient, blinking, stretching, or snapping.

If a further input request is received for either scaling or scrolling the document as part of a single continuous input with the initial input request, then the system restrains, up to a certain degree, the user from scrolling or scaling the document beyond the current optimal scale and position. For example, if the initial input request is a touch input from a user to scroll the document, then the document may initially scroll and scale to an optimal scale and position to view relevant identified content while the user is still scrolling using the touch input. If the user continues the touch input to provide a further input request to scroll beyond the optimal scale and position of the relevant identified content, then the system will not scroll the document until after a certain distance of the further input request is received. Additional graphical feedback can be provided while the user provides the further input request to indicate that the further input request would change the scale and position of the document to a non-optimal scale and non-optimal position.

FIG. 1 illustrates an example architecture 100 for optimizing a scale and position of a document in response to a user input. The architecture 100 includes servers 130 and clients 110 connected over a network 150.

Each of the clients 110 is configured to load and execute an application for viewing a document. The document includes portions of content that may be of interest to a user viewing the document. The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. One of the many servers 130 to which the clients 110 are connected over the network 150 may be configured to host a document information repository that identifies, for a certain document, the interesting portions of content in that document. For purposes of load balancing, multiple servers 130 can host the document information repository. The servers 130 can be any device having an appropriate processor, memory, and communications capability for hosting data encoder service. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The application is configured to receive a scroll or scale (e.g., zoom) input request from a user for a document displayed in the application. The request can be, for example, a touch input request received via a touchscreen. While the application is receiving the input request, the application adjusts a position and scale of the document to optimal levels to view content that is determined to be the intended content the user seeks to view by providing the input request. As discussed herein, an optimal scale and optimal position for viewing a document includes adjusting the zoom level and position of the document to facilitate visibility or readability of the content by a user. For instance, if a user seeks to scroll to a certain target position of the document, the application will identify intended content the user seeks to view and optimally position and scale the document to view the content while the user's input request is being received. Similarly, if a user seeks to scale to a certain target scale of the document, the application will identify intended content the user seeks to view and optimally position and scale the document to view the content while the user's input request is being received. Content that may be relevant to a user input request may be identified prior to receiving the input request or while receiving the input request.

Figure 2:
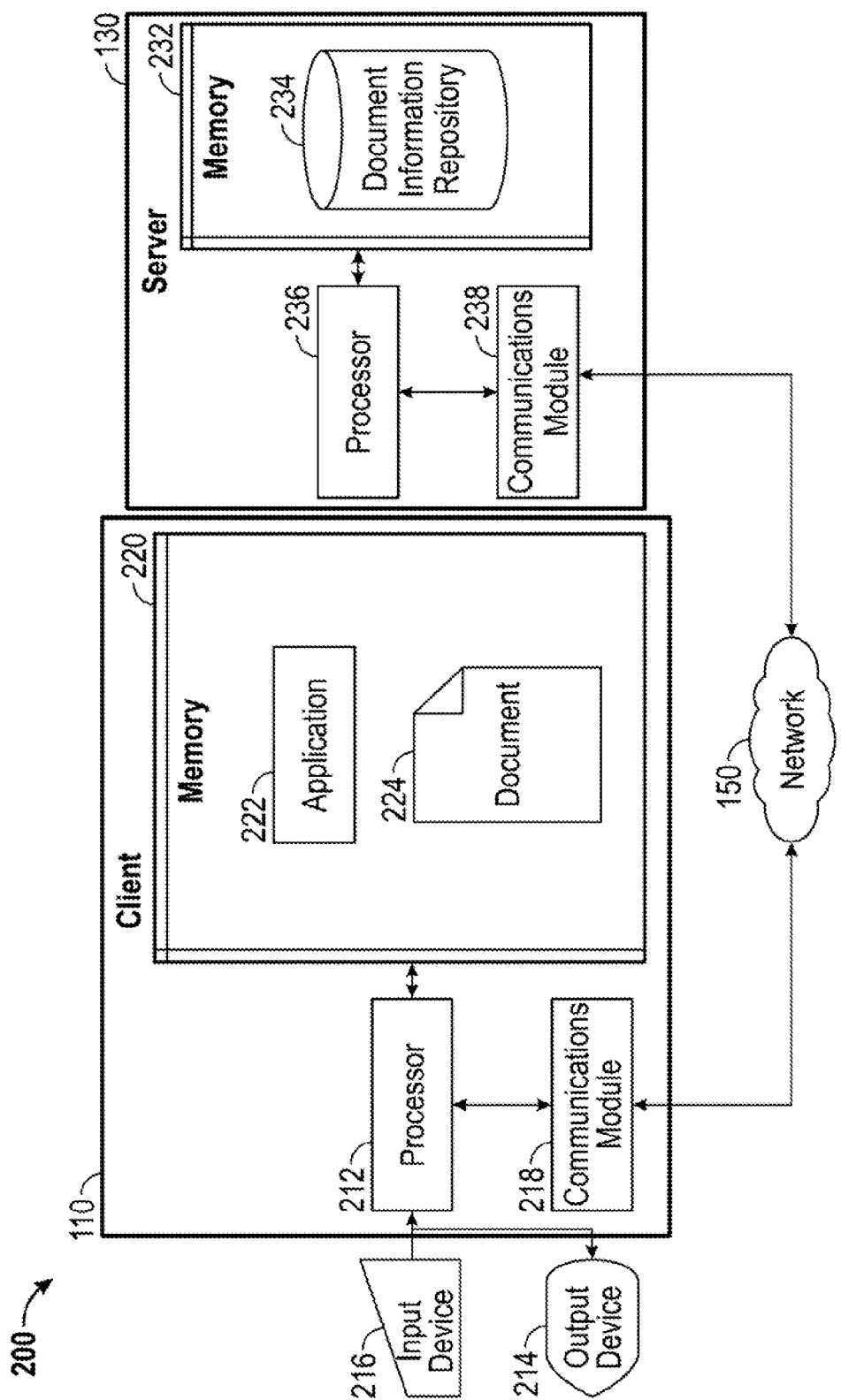
FIG. 2 is a block diagram illustrating an example client from the architecture of FIG. 1 according to certain aspects of the disclosure.

FIG. 2 is a block diagram illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220 that includes an application 222 and a document 224 for viewing in the application 222. The client 110 also includes an input device 216, such as a touch input (e.g., touchpad or touchscreen), keyboard, or mouse, and an output device 214, such as a display. The processor 212 of the client 110 is configured to execute instructions, such as instructions physically coded into the processor 212, instructions received from software in memory 240 (e.g., from the application 222), or a combination of both for optimizing a scale and position of the document 224 in response to a user input. For example, the processor 212 of the client 110 executes instructions to receive an initial input request to scroll (or "pan") a document to a target position of the document 224, and identify at least one relevant portion of content at or near the target position of the document 224.

The relevant portion of content in the document 224 can be identified prior to receiving the initial input request or during receipt of the initial input request. For example, the processor 212 can be instructed by the application 222 to identify relevant portions of content when the document 224 is first loaded into memory 220, such as by updating a list of relevant portions of content for the document 224 incrementally as the document 224 loads. The processor 212 can be instructed by the application 222 to identify relevant portions of content when the initial input request to scroll or scale the document 224 is received. For instance, portions of content near where the input request originated with respect to the document 224 may be considered rather than the entire document 224.

Relevant portions (or "interesting boxes"), such as boxes, columns, regions, or objects of content in the document 224 can be identified using various approaches, including graphical and semantic approaches. The identified relevant portions of content for the document 224 can be stored in a document information repository 234 in a memory 232 of a server 130 in order to facilitate an efficient identification of relevant portions of content for a document 224 by saving the results of an analysis of the document 224 to the server 130, thereby avoiding repeatedly analyzing the same document 224 on different clients 110 to identify the same relevant portions of content in the document 224. The relevant portions of content may then be provided to the application 222 on the client 110 when the document 224 is loaded in the application 222 via respective communications modules 218 and 238 of the client 1110 and server 130 using their respective processors 212 and 236.

A graphical approach to identifying relevant portions of content in the document 224 may consider portions of content that are separated by visual margins, borders, or other separators from other portions of content. Spatial cues like size and position may also be considered.

A semantic approach can also be used to identify relevant portions of content in the document 224. For many software applications such as the application 222, the rendering displayed for a document such as document 224 is commonly derived from a data model. Consequently, by linking interesting (e.g., significant, contextually relevant, or an exhaustive list of) entities or groups thereof in the data model to the portion of the document 224 in which they appear and based on the type of the application 222, relevant portions of content and their positions in the document 224 may be identified. For example, in an application 222 configured for mapping, towns, roads and other entities can be found and optionally prioritized based on their geometric size, population, or other measures of significance. As another example, in an application 222 configured for web browsing, several approaches to semantically identify relevant portions of content may be used. For instance, when the document 224 is a web page, the structure of the Document Object Model (DOM) tree of the web page can be used to derive a hierarchy that may be broken down based on the size, position, layout properties, and other properties of elements in the hierarchy. A web browser configured to use text autosizing may also have partial information as to the blocks of text on a page from which cues may be taken. A web browser configured with a reader mode may use the reader mode to identify relevant portions of content in a web page. Additionally, a web page may be segmented according to various approaches to identify relevant portions of content.

All of the content in a document 224 may be segmented in its entirety to identify relevant portions of content, or in certain aspects a subset of the content in a document 224 deemed to be most relevant may be identified as relevant portions of content. With the express authorization of a user, a relevancy of portions of content may further be identified using eye tracking or cursor or finger tracking to determine what the user is likely paying attention to. For content such as an image that has no known explicit boxes, columns, or objects, image recognition may be used to identify relevant portions or content. In certain aspects, relevant portions may be identified in a document 224 using such techniques to weigh importance without a need to divide the document 224 into discrete segments. Such relevant portions may be associated together to determine an optimal viewing scale and position.

Using the identified relevant portions of content in the document 224, the processor 212 is configured to adjust a position and scale of the document, while receiving the initial input request, to an optimal position and an optimal scale for viewing the relevant portion of the document 224. As a result, a user does not need to provide a scale input (e.g., a pinch to zoom input on a touch interface) for the application 222 to adjust the scale and position of the document 224. This feature is particularly useful when different portions of the document 224 have different optimal scales for viewing, as is the case for an application 222 using a text autosizing algorithm. In certain aspects, instead of scaling the document 224 to view relevant text content, the application 222 may instead adjust a font size of the text to an optimal reading size for reading the text (e.g., while receiving the initial input request).

For instance, while the user is providing an input request to scroll the document 224, the processor 212 can identify relevant portions of content within the viewport of the client 110. In certain aspects, content in the document 224 near the center of the viewport may be provided greater relevance weight (e.g., by being analyzed first) as a user commonly terminates the input request with content they are interested in approximately centered within the viewport. If the user scrolls along a single axis, whether vertically or horizontally in the document 224, the user may have centered relevant content along the single axis, and the processor 212 may use other information and heuristics to estimate a position of the relevant content along the other axis. In certain aspects, the processor 212 may predict that the relevant portion of content is to be centered along the other axis or aligned with corresponding edges of the output device 214.

When the provided input request scrolls a display of the document 224 within the viewport to reach an edge of the document 224, the processor 212 may identify that the user is interested in content near the edge of the document 224, but may be unable to center the content of the document 224 within the viewport because the positioning of the document is near the edge, such as where the application 222 does not permit scrolling of the document 224 past the edge of a document 224. In such cases, when identifying relevant content near the edge of the document 224, the processor 212 is configured to provide greater weight in determining relevance to content near the scrolled to edge of the document 224.

If the input request to scroll the document 224 is a manual scroll (e.g., on a touch input device 216, this is while the user's finger is touching the input device 216) rather than a momentum scroll (or "fling to scroll"), the processor 212 may highlight or otherwise visually indicate relevant portions of content in the document 224 on the output device

214. A visual indicator identifying the relevant portions of content in the document 224 may be provided that further indicates a confidence value associated with the relevant portion of content.

A visual indicator identifying relevant portions of content in the document 224 may be provided in various ways, such as by highlighting the relevant content or adjusting tracking or speed of movement of the document 224 in response to the input request, or a combination thereof. Relevant content may be highlighted using borders around the content, coloring of the relevant content or its background, adjusting a font size or appearance of the relevant content, or animating the relevant content (e.g., using blinking text).

The tracking of the document 224 may be adjusted to indicate relevant content by having the position of the document 224 adjust away from the direction of the user's input request and in the direction of the relevant content that would be followed once the user ends the input request. The tracking adjustment can be visually indicated by, for example, a line from the position of the input request (e.g., from the position of the user's finger on a touchscreen interface) to the relevant portion of content. The tracking adjustment can also be visually indicated by distorting or otherwise deforming the rendering of the document 224 at or near the position of the input request with respect to the document 224 (e.g., at or near where a finger is pressing on a touchscreen interface), as if the document 224 was being stretched at the position of the input request. A confidence value of the relevant content may be indicated by a degree by which the relevant content pulls away. For example, a zero degree pull away would appear as the document not stretching, thereby indicating that when the input request is released the document 224 will not be snapped to. In certain aspects, the tracking of the document 224 may be adjusted to indicate relevant content by having the position and scale of the document 224 adjust completely to the optimal position and scale for viewing the relevant content to be used once the user ends the input request.

The speed of movement of the document 224 in response to an input request to scroll may also be adjusted to indicate relevant content. For example, the movement speed may be increased when the document 224 is being scrolled in the direction of the relevant content, and the movement speed may be decreased when the document 224 is being scrolled away from the relevant content (e.g., such that movement of the document 224 lags slightly behind or ahead of the positioning of the input request). When adjusting the speed of movement of the document 224 in response to the input request, snapping of the document 224 may be limited to when the input request is released near relevant content.

Once the visual indicator for a relevant portion of content is provided, the processor 212 is configured to permit the user to scale and position the document 224 to a more optimal level and position for viewing the relevant portion of content. The processor 212 may alternatively automatically scale and position (or "snap") the document 224 to an optimal level and position. In certain aspects, snapping a document 224 does not require both optimization of the scale and position of the document 224 to view the relevant portion of content within the viewport, but may instead be limited to optimizing the scale of the document 224 without adjusting the position of the document 224 (e.g., for relevant portions of content that are relatively small in size at an optimal scale as compared to the viewport).

In certain aspects where the user is permitted to scale and position the document 224, in order to provide a visual indicator for relevant content that the user may intend to view, the relevant content may be visually identified using, for example, shadowing, a change of color, a change of gradient, blinking, stretching, or snapping visual effects. In order to provide a visual indicator for relevant content that is larger or otherwise outside the viewport of the output device 214, a radial gradient outline may be provided for display that is fully opaque at each edge of the relevant content, and gradually becomes more translucent in a direction towards the center of the relevant content. In such cases, even if the edge of the relevant content is outside the viewport of the client 110, a user may easily estimate how far away portions of the relevant content are outside the viewport.

In certain aspects where the processor 212 is configured to snap the document 224 to an optimal scale and position, a visual effect for the snapping can include a smooth animation or springing to convey to the user what occurred. In certain aspects, the processor 212 is configured to snap the document 224 to the optimal scale and position for a relevant portion of content when a confidence value for the relevant portion of content in the document 224 meets or exceeds a threshold confidence value. This approach is effective for aspects where a user may not desire the processor 212 to regularly snap the document 224 to content the processor 212 identifies as relevant.

The confidence value for a relevant portion of content may be based on whether the relevant portion of content is at or near (in scale and position) to where the user ended the input request, or when the relevant portion of content in the document 224 is deemed to be sufficiently relevant as discussed above (e.g., using eye tracking).

A user may be provided with an interface for canceling snapping behavior by the application 222. For example, a confidence value associated with a relevant portion of content may decrease over time if the user provides a further input request to scroll or scale the document 224 (e.g., by continuing the input request) after the document 224 has been snapped. A single input request may include the initial input request and the further input request, such that both the initial input request and the further input request are part of one continuous input request. For example, with a touch interface input device 216, a user may touch the input device 216 with the user's finger and drag the finger across the input device 216 in a direction to provide the initial input request. The user may then pause movement of the user's finger, and then resume dragging the user's finger in the direction to provide the further input request without ever having raised the user's finger from the input device 216. After providing the further input request, the user may then lift the user's finger 216 from the input device. As another example, with a touch interface input device 216, a user may provide a multi-touch pinch action to the input device 216 with the user's fingers to provide the initial input request to zoom out of the document 224 (or multi-touch spread action to zoom in to the document 224). The user may then pause movement of the user's fingers, and then resume the pinching action to provide the further input request without ever having raised the user's fingers from the input device 216.

As such, if a further input request to scroll the document is received for a distance that exceeds a threshold distance value, then the document 224 may be scrolled to a non-optimal position for viewing the relevant portion of content. If, however, the further input request does not exceed the threshold distance value, the document 224 may maintain its optimal position for viewing the relevant portion of content. Similarly, if a further input request to scale the document is received for a scaling level that exceeds a threshold scale value, then the document 224 may be scaled to a non-optimal position for viewing the relevant portion of content. If, however, the further input request does not exceed the threshold scale value, the document 224 may maintain its optimal scale for viewing the relevant portion of content.

A confidence value associated with a relevant portion of content may also decrease over time if the user provides an alternative input request other than scrolling or scaling (e.g., a cancellation input request, such as shaking a position of a finger on a touch interface). If the further input request is received after the document 224 has been positioned to an optimal position or scaled to an optimal scale for viewing the relevant content, then the processor 212 is configured to display graphical feedback indicating the document 224 is in an optimal position and/or optimal scale for viewing the relevant portion of content. The graphical feedback can include, for example, a shadowing effect, a change of color, a change of gradient, a blinking effect, a stretching effect, or a snapping effect.

A confidence value associated with a relevant portion of content may be graphically indicated. For example, a thickness, opaqueness, or other visual indicator associated with the visual identification of the relevant portion of content may be changed so that a user can see how likely the application 222 is to adjust the scaling and positioning of the document 224.

If the input request to scroll the document 224 is a momentum scroll, the processor 212 is configured to calculate a target position for displaying the document 224, and then identify relevant portions of content at or near the target position for displaying the document 224. A distance to a target destination of the momentum scroll in the axis direction of the momentum scroll may be adjusted in length if necessary to position the document 224 in an optimal position for viewing relevant content. In certain aspects, if a confidence value associated with relevant content near a target destination is high, a position of the document 224 along the axis perpendicular to the axis direction of the momentum may be adjusted as well. Additionally, the scale (e.g., zoom level) of the document 224 may be adjusted in addition to the position of the document 224 in order to provide an optimal scale for viewing relevant content. Such document position and scale adjustments in response to an input request (e.g., on-axis scroll distance, off-axis scroll offset, and zoom level) may be done smoothly over the course of the momentum scroll, although in certain aspects the adjustments may be provided to a greater degree towards the end of the momentum scroll in case the user attempts to prematurely end the momentum scroll.

In addition to receiving an input request to scroll the document 224, the processor 212 of the client 110 is also configured to execute instructions to receive an initial input request to scale the document 224 to display a target portion of the document 224, identify at least one relevant portion of content at or near the target portion of the document 224, and adjust a position and scale of the document 224 while receiving the initial input request to an optimal position and to an optimal scale for viewing the relevant portion.

For instance, the user may indicate using an input request to scale the document 224 that the user would like to zoom in or out of the document 224. The input request to scale the document 224 can be, for example, an instantaneous scaling action such as tapping the touch interface, a keyboard shortcut, or mouse-wheel scroll. The input request to scale the document 224 can also be an action performed over a period of time, such as a pinch gesture on a touch interface input device 216 or other touch gestures.

For instantaneous scaling actions, such as a pressing a keyboard shortcut, the processor 212 is configured to determine relevant content at or near the target region of the scaling action (e.g., within a smaller area than the viewport when zooming in, or within a larger area than the viewport when zooming out). The processor 212 then adjusts the scale in the direction the user has requested via the instantaneous scaling action, but rather than adjusting the scale by a preset amount for the instantaneous scaling action, the processor 212 adjusts the scale of the document 224 to a level that is optimal for viewing the relevant content and adjusts the position of the document 224 to an optimal viewing position (e.g., having the relevant content within the viewport). For example, if the relevant content is displayed primarily at the top-left of the output device 214, the processor 212 is configured to adjust the scale and position of the document 224 for the top left region of the output device 214.

For input requests to scale the document 224 performed over a period of time, such as a pinch to zoom action, continuous visual feedback may be provided to assist guiding the user towards a relevant portion of the document 224. Continuous visual feedback may be provided by either permitting the user to scale and position the document 224 to a more optimal level and position for viewing the relevant portion of content, or automatically snapping the document 224 to an optimal level and position, as discussed above.

If the input request to scale the document 224 is performed quickly, a confidence value associated with relevant content within the intended scaled region of the document 224 may be assigned based on the speed of the input request. For example, a greater confidence value may be assigned when an input request to scale is performed quickly because the user is likely not being careful in scaling to content, as compared to when the input request to scale the document 224 is performed slowly which may indicate the user is performing a careful scaling towards specific content in the document 224. Configuration of whether an input request to scale is considered fast or slow may be calibrated manually or automatically for each user. Relevant content having higher confidence values are more likely to be snapped to than relevant content having lower confidence values.

In certain aspects, if the input request is to scroll the document 224 to a target position from an initial position having an initial scale, the processor 212 can be configured to identify another relevant portion of content between the initial position of the document 224 and the target position of the document 224. If the other relevant portion of content has a different optimal scale for viewing than the optimal scale for viewing the initially identified relevant portion, then the processor 212 can maintain the initial scale of the document 224 while receiving the initial input request and providing the other relevant portion of content for display, until the target position of the document is provided for display 224. As a result, the document 224 is not scaled to various degrees multiple times during positioning of a document when the positioning of a document passes over or across other relevant portions of content.

Figure 3A:
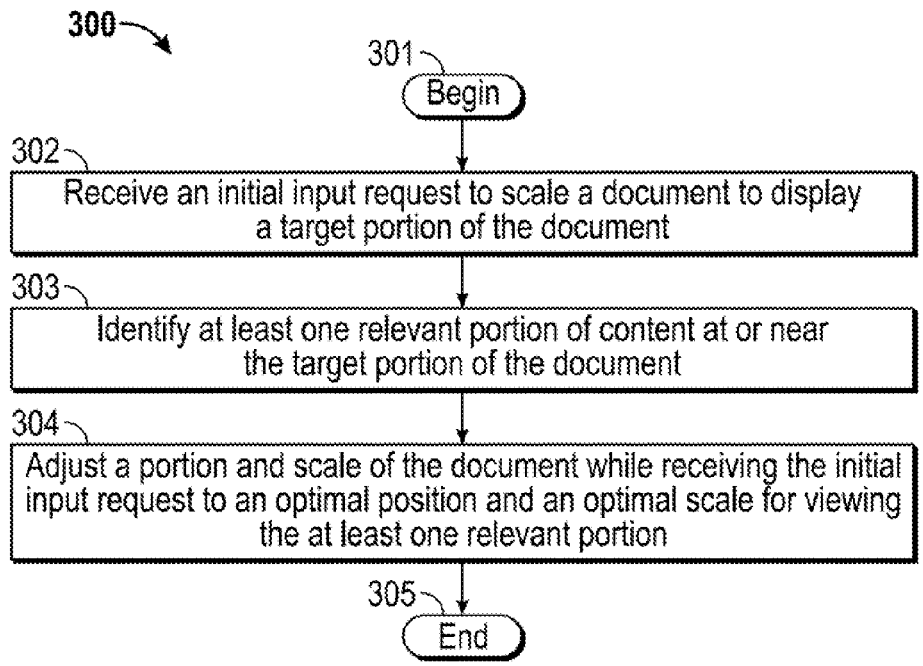
FIGS. 3A and 3B illustrate example processes for optimizing a scale and position of a document in response to various user inputs using the example client of FIG. 2.

FIG. 3A illustrates an example process 300 for optimizing a scale and position of the document 224 in response to a user input to scale the document 224 using the example client 110 of FIG. 2. While FIG. 3A is described with reference to FIG. 2, it should be noted that the process steps of FIG. 3A may be performed by other systems.

The process 300 begins by proceeding from beginning step 301 when a document 224 is loaded in the application 222 to step 302 when an initial input request to scale the document 224 to display a target portion of the document 224 is received. Next, in step 303, at least one relevant portion of content at or near the target portion of the document 224 is identified, and in step 304, while still receiving the initial input request, a position and scale of the document 224 is adjusted to an optimal position and an optimal scale for viewing the relevant portion of the document 224. The process 300 then ends in step 305.

Figure 3B:
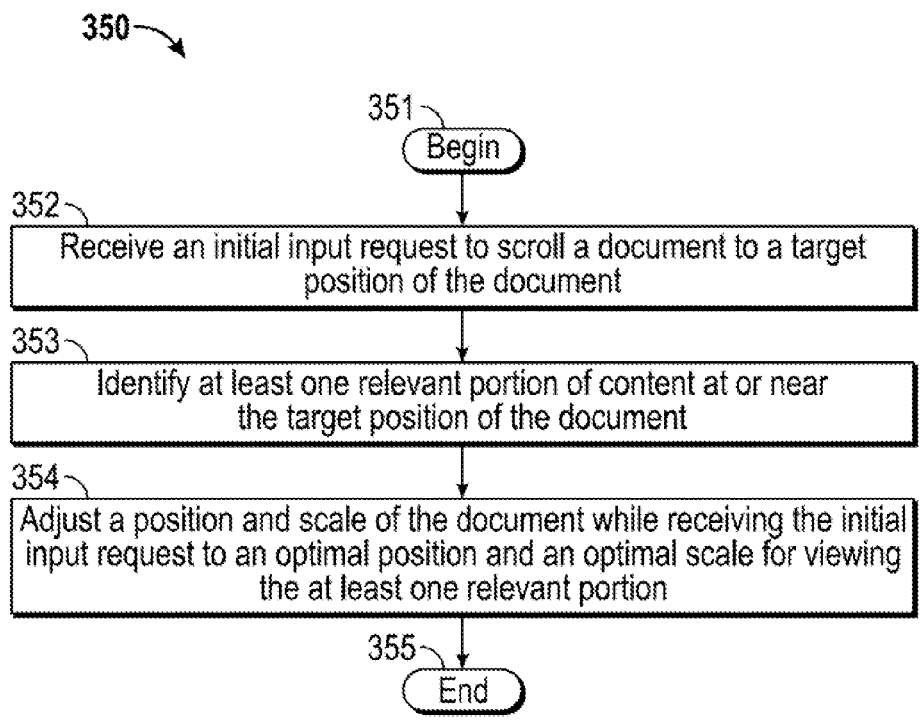

FIG. 3B illustrates an example process 350 for optimizing a scale and position of the document 224 in response to a user input to scroll the document 224 using the example client 110 of FIG. 2. While FIG. 3B is described with reference to FIG. 2, it should be noted that the process steps of FIG. 3B may be performed by other systems.

The process 350 begins by proceeding from beginning step 351 when a document 224 is loaded in the application 222 to step 352 when an initial input request to scroll the document 224 to a target position of the document 224 is received. Next, in step 353, at least one relevant portion of content at or near the target position of the document 224 is identified, and in step 354, while still receiving the initial input request, a position and scale of the document 224 is adjusted to an optimal position and an optimal scale for viewing the relevant portion of the document 224. The process 350 then ends in step 355.

FIGS. 3A and 3B set forth an example process 300 for optimizing a scale and position of a document in response to a user input using the example client 110 of FIG. 2. Examples will now be described using the example processes 300 and 350 of FIGS. 3A and 3B, an application 222 that is a web browser, and a document 224 that is a web page.

Figure 4A:
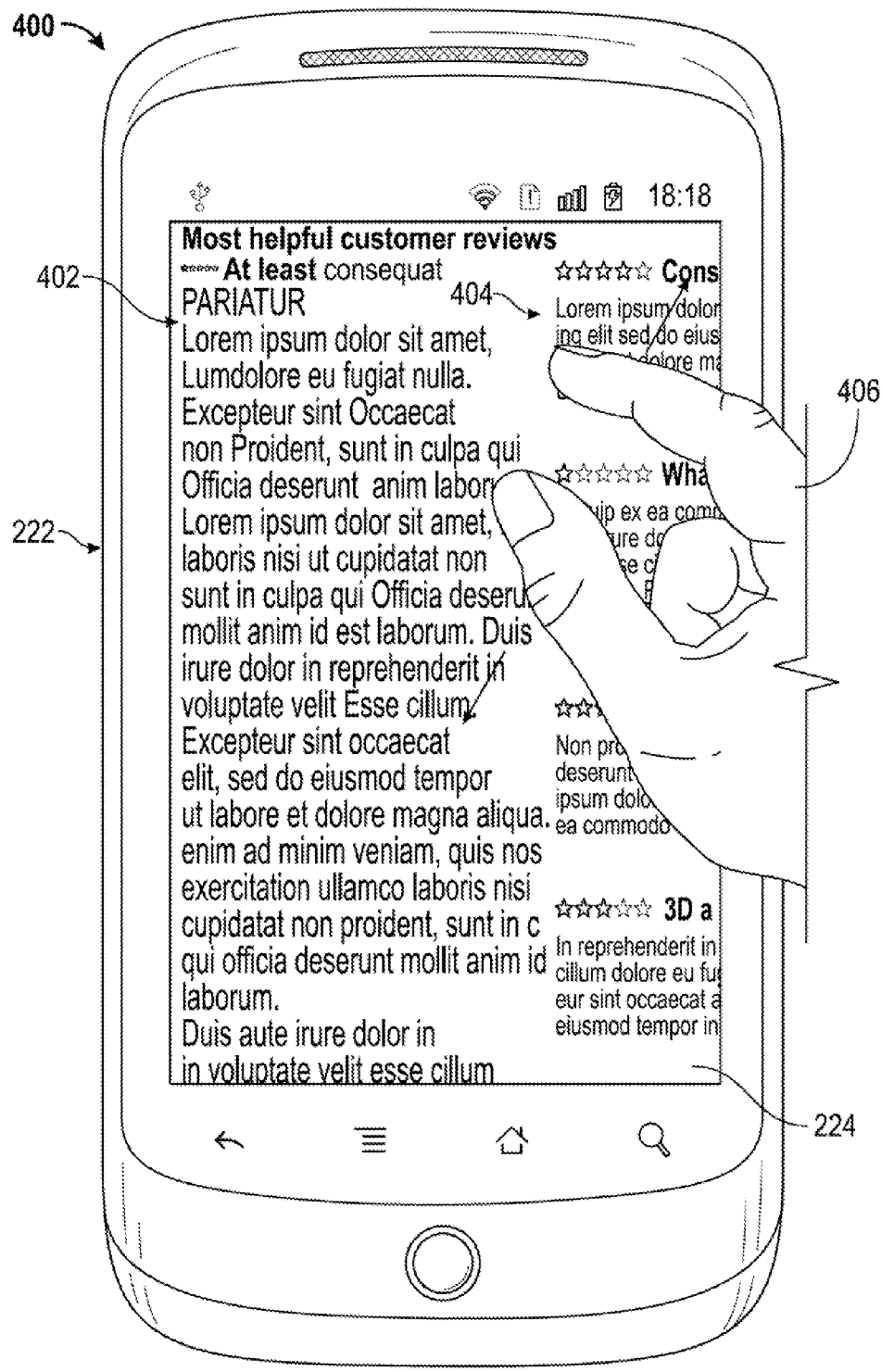
FIGS. 4A-4G are example illustrations associated with the example processes of FIGS. 3A and 3B.
Figure 4B:
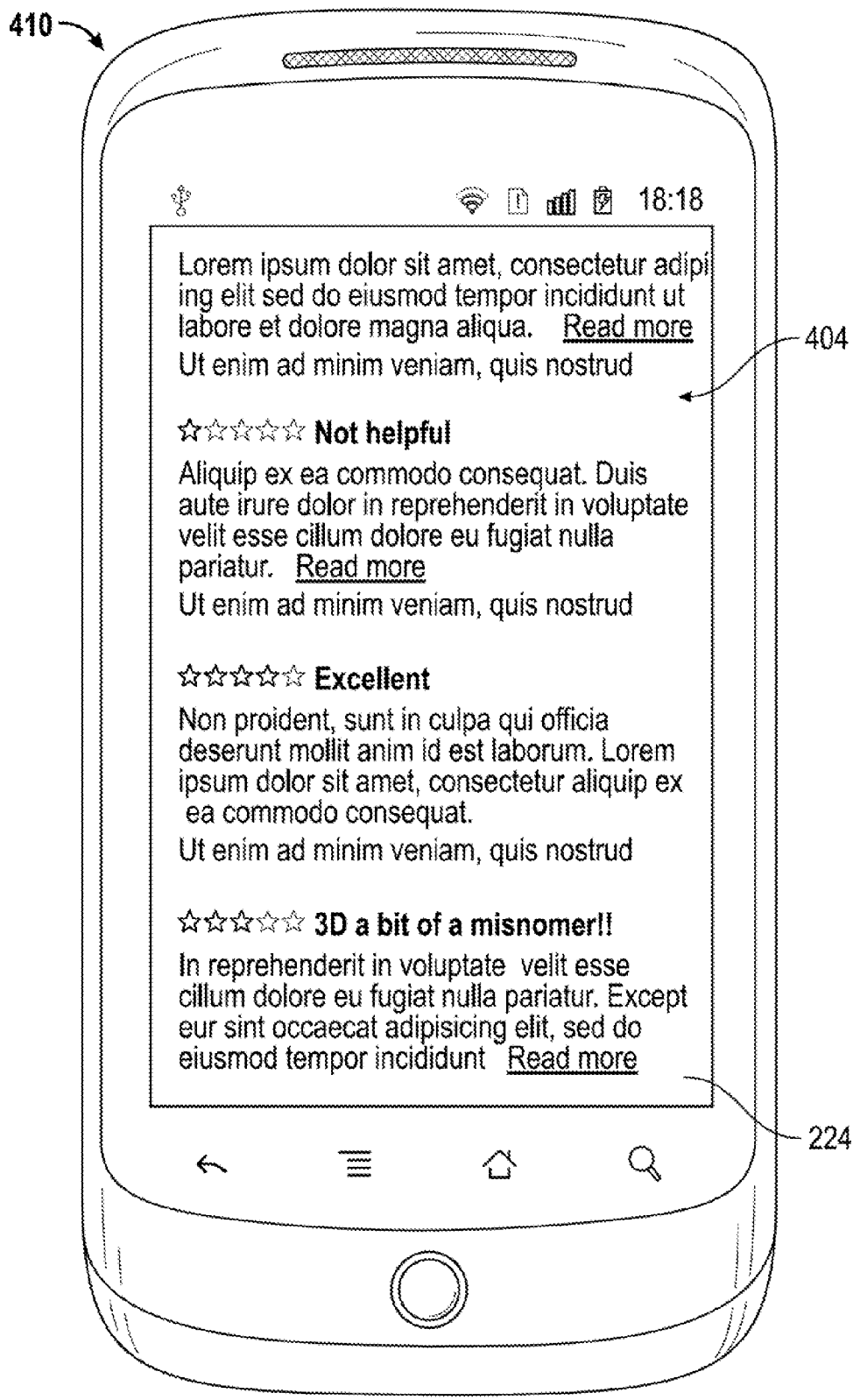
Figure 4C:
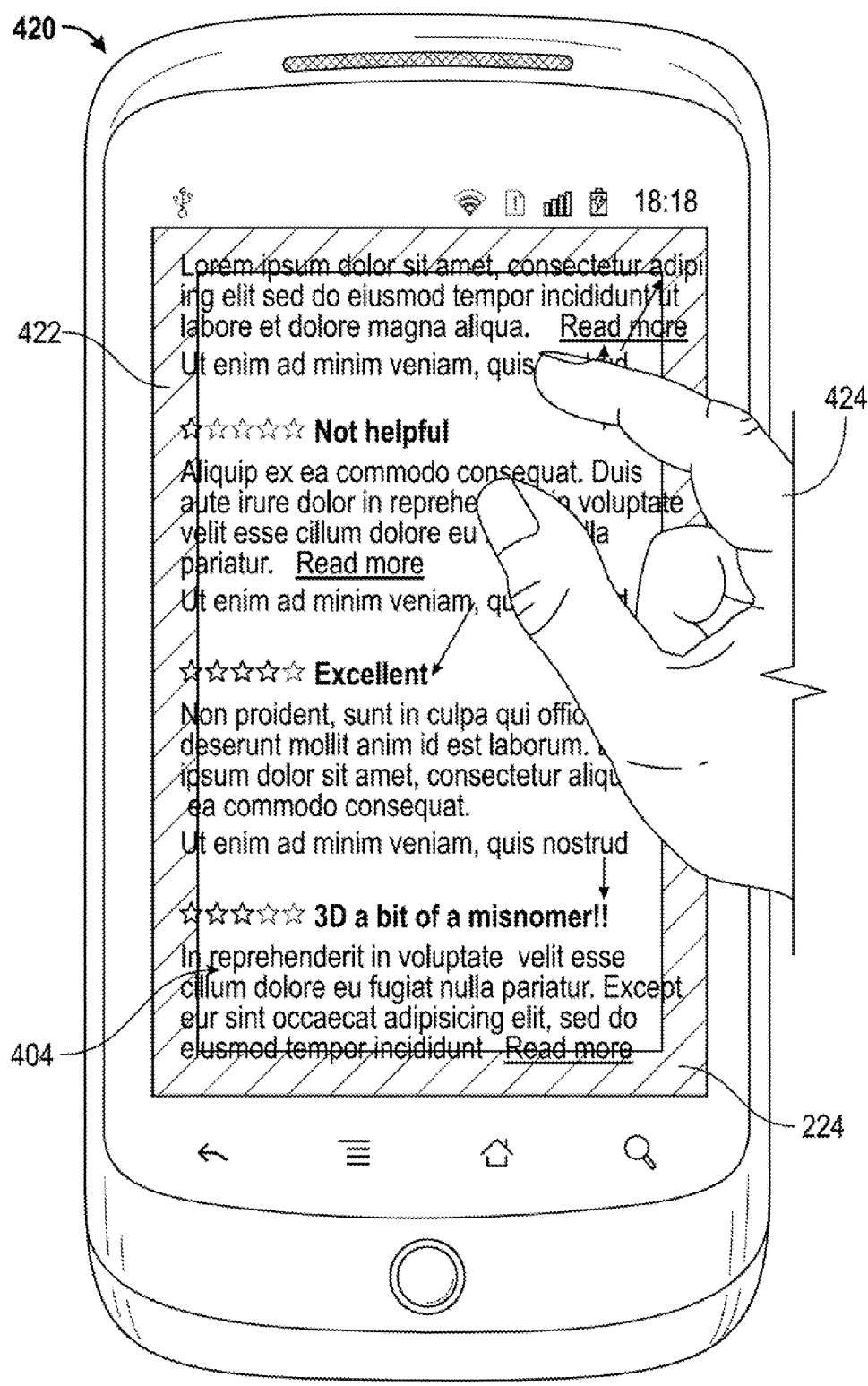

With reference to the process 300 of FIG. 3A, the process 300 begins by proceeding from beginning step 301 when a web page 224 is loaded in the web browser 222. As provided in the example illustration 400 of FIG. 4A, the web page 224 has two relevant portions 402 and 404 of content. One relevant portion of content 402 towards the left side of the web page 224 is displayed in a larger font size than the other relevant portion of content 404 on the right side of the web page 224, which is displayed in a smaller font size. In step 302, an initial input request is received from a user that is for a multi-touch spread input 406 to scale the web page 224 to display a target portion of the web page 224 at a more magnified scale. Next, in step 303, the relevant portion of content 404 at or near the target portion of the web page 224 to be scaled is identified, and in step 304, while still receiving the initial multi-touch spread input request, a position and scale of the web page 224 is adjusted to an optimal position and an optimal scale for viewing the relevant portion of the web page 224, as provided in the example illustration 410 of FIG. 4B. If the user provides a further multi-touch spread input request 424 after the optimal scale and position for viewing the relevant portion of content 404 have been reached, the web browser 222 provides a visual indicator 422 indicating that the current viewing scale and position of the web page 224 is an optimal viewing scale and position for the relevant content 404. The process 300 then ends in step 305.

Figure 4D:
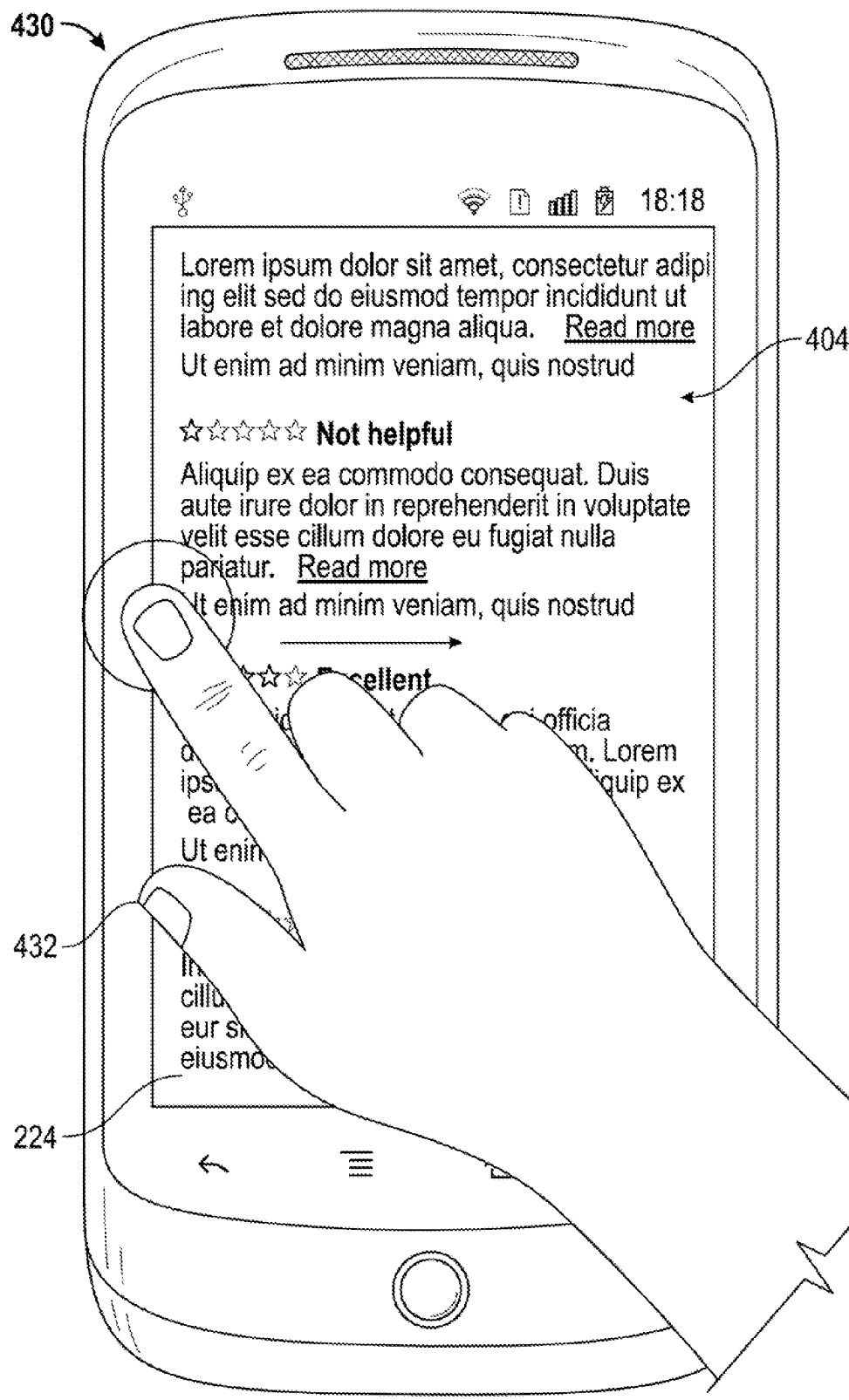
Figure 4E:
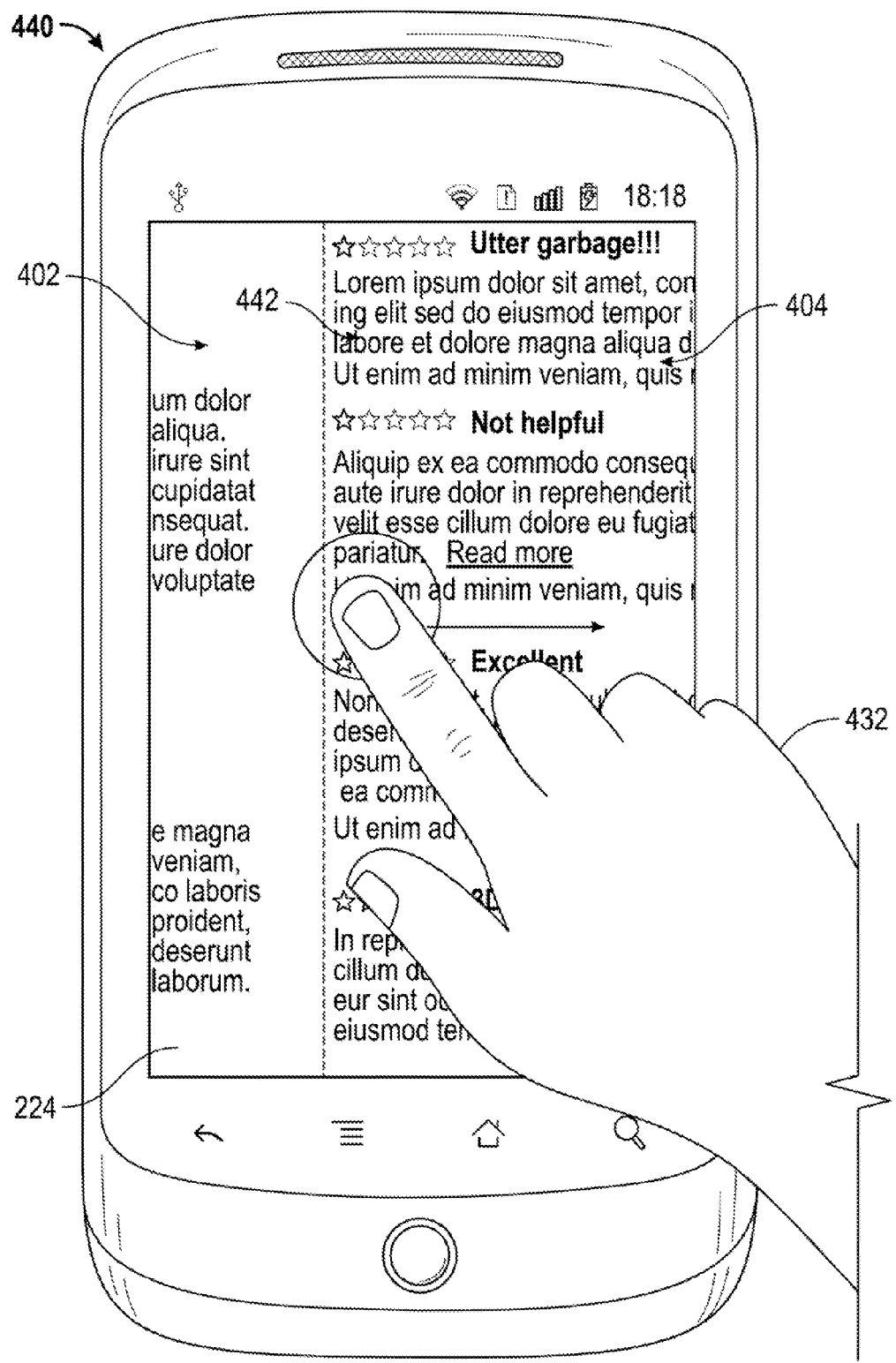
Figure 4F:
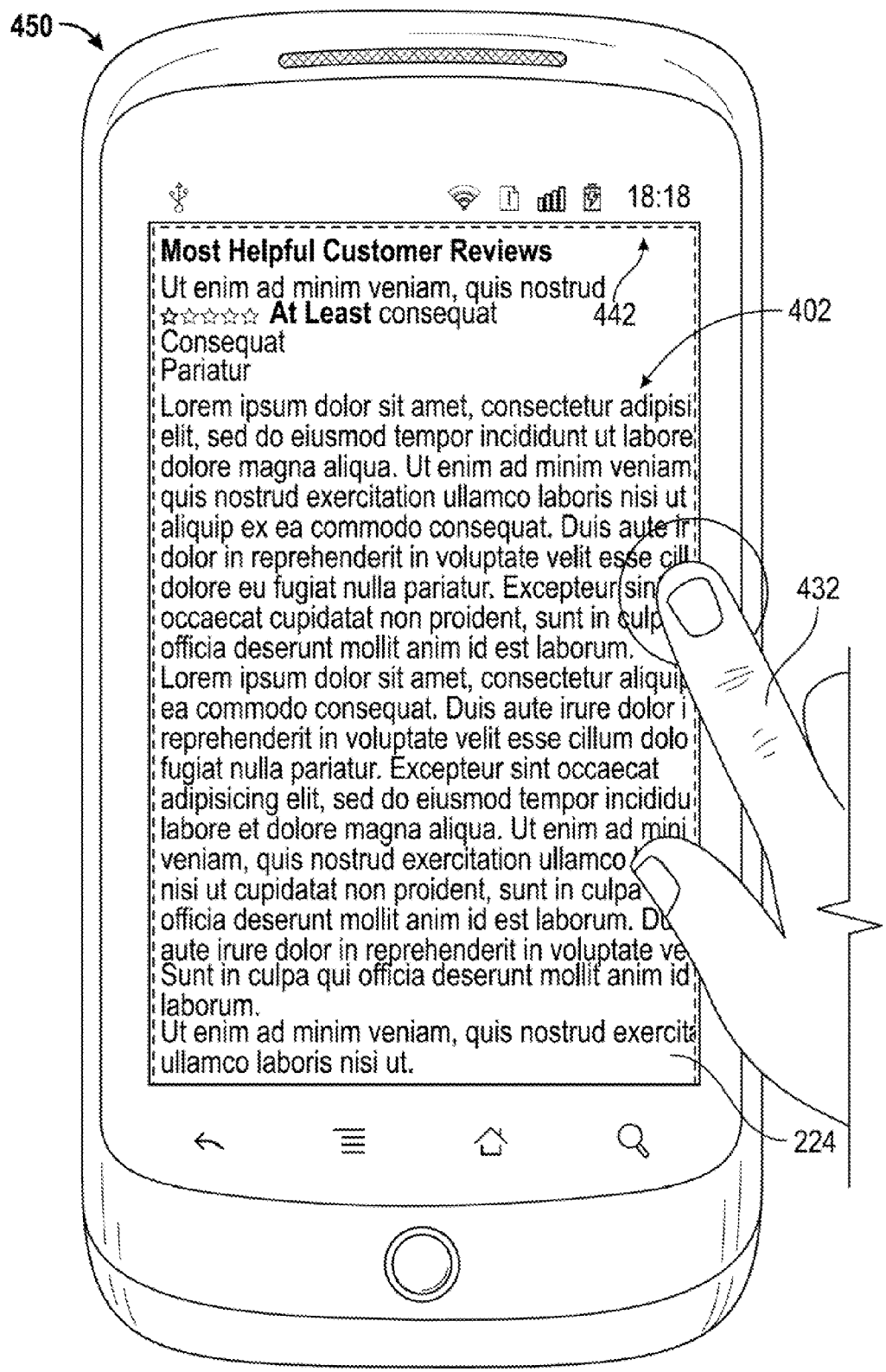
Figure 4G:
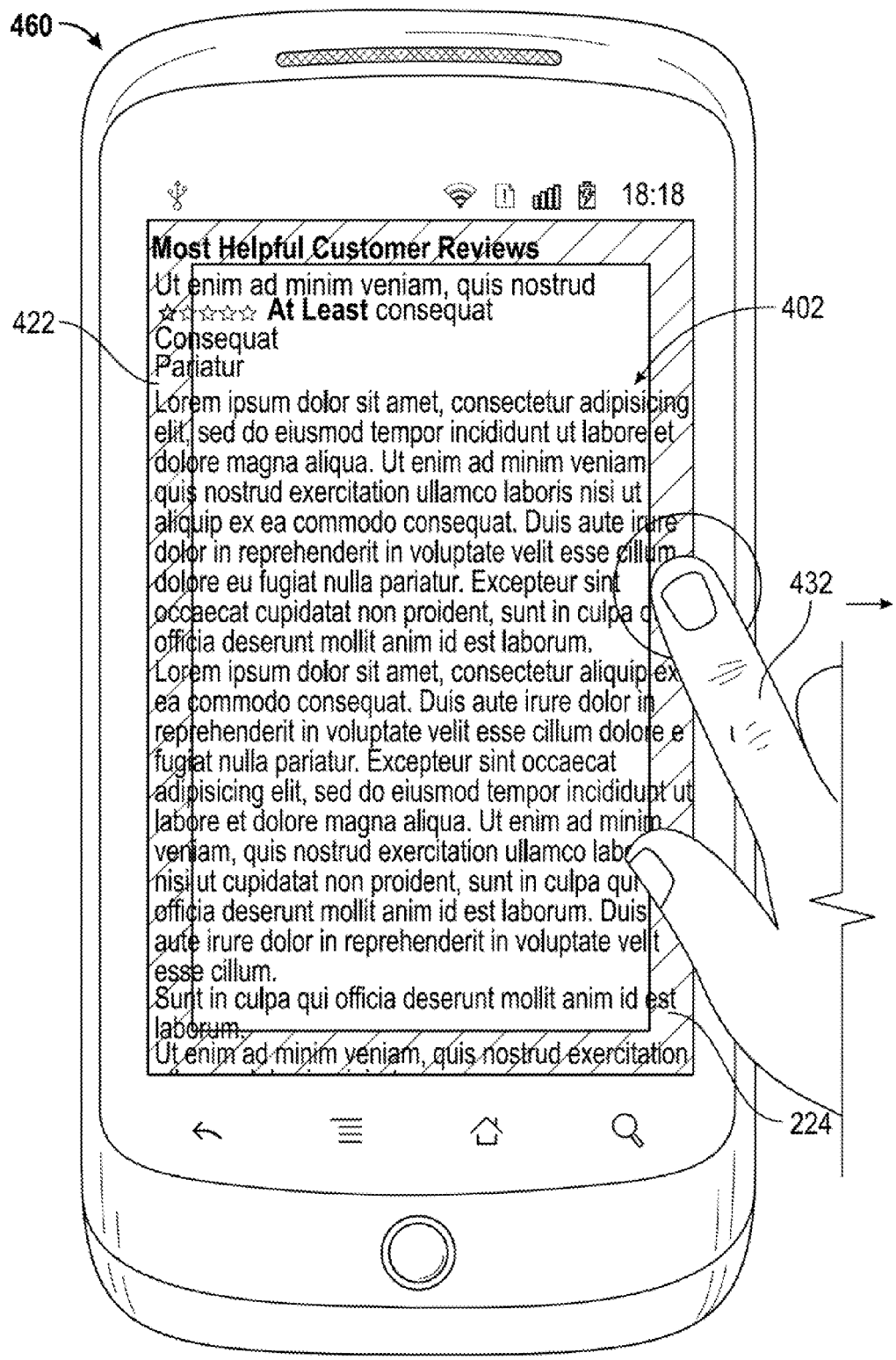

With reference to the process 350 of FIG. 3B, the process 350 begins by proceeding from beginning step 351 when a web page 224 is loaded in the web browser 222 to step 352 when an initial touch input request 432 to scroll the web page 224 from an initial position viewing content 404 having a first, smaller size to a target position of the web page 224 is received as provided in the example illustration 430 of FIG. 4D. The content 402 at the target position of the web page 224 has a larger size than the content 402 at the initial position of the web page 224. Next, in step 353, at least one relevant portion of content at or near the target position of the document 224 is identified. FIG. 4E provides an example illustration 440 of the web page 224 being scrolled while receiving the initial touch input request 432. The relevant content 402 at the target position of the web page 224 is indicated using a visual indicator 442 that is a dotted line outlining the relevant content 402. In step 354, while still receiving the initial touch input request 432, a position and scale of the web page 224 is adjusted to an optimal position and an optimal scale for viewing the relevant portion of content 402 of the web page 224 as provided in the example illustration 450 of FIG. 4F. If the user provides a further touch input request 432 after the optimal scale and position for viewing the relevant portion of content 402 have been reached, the web browser 222 provides a visual indicator 422 indicating that the current viewing scale and position of the web page 224 is an optimal viewing scale and position for the relevant content 402. The process 350 then ends in step 355.

Figure 5:
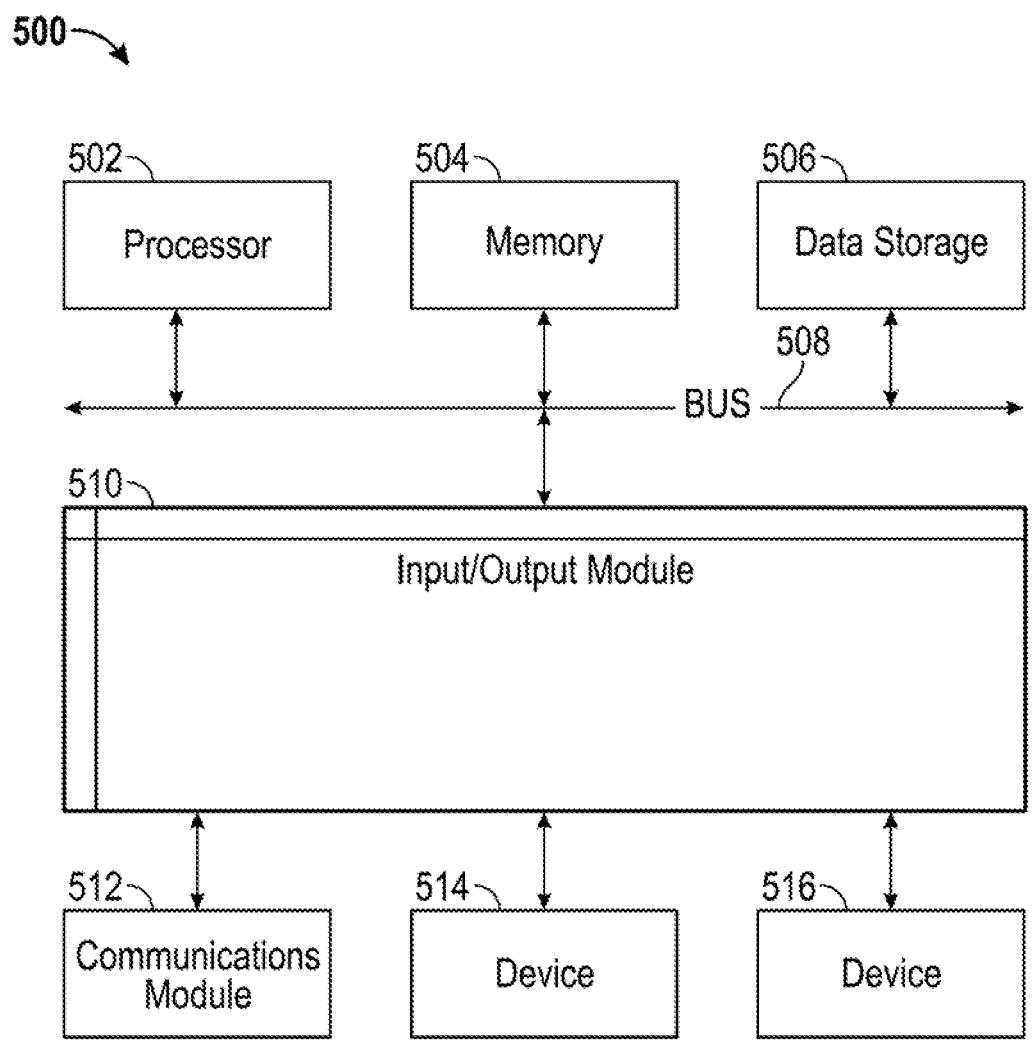
FIG. 5 is a block diagram illustrating an example computer system with which the client and server of FIG. 2 can be implemented.

FIG. 5 is a block diagram illustrating an example computer system 500 with which the client 110 and server of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and servers 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "left," "right" and the like as used in this disclosure should be understood as referring to an arbitrary frame of reference, rather than to the ordinary gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

These and other implementations are within the scope of the following claims.

What is claimed is:

1. A computer-implemented method for optimizing a scale and position of a document in response to a user input, the method comprising:
    receiving an initial input request to scroll a document to a target position of the document;
    identifying at least one relevant portion of content at or near the target position of the document;
    adjusting a position and scale of the document during receiving the initial input request to increase visibility or readability of the at least one relevant portion;
    receiving a further input request to scroll the document by a distance, wherein the further input request is part of a single continuous input with the initial input request, and the single continuous input is a single touch and drag input request;
    when the distance of the further input request does not exceed a threshold, maintaining the document in the adjusted position and scale during receiving the further input request; and
    when the distance of the further input request does exceed the threshold, further adjusting the adjusted position and scale of the document during the further input request.

2. The method of claim 1, further comprising providing, for display, graphical feedback when the document is maintained in the adjusted position and scale in response to the further input request.

3. The method of claim 2, wherein the graphical feedback comprises at least one of a shadowing effect, a change of color, a change of gradient, a blinking effect, a stretching effect, or a snapping effect.

4. The method of claim 1, further comprising providing, for display, a visual identification of the at least one relevant portion while receiving the initial input request.

5. The method of claim 1, wherein the at least one relevant portion of content comprises text, and the method further comprising adjusting a font size of the text to an optimal reading size for reading the text while receiving the initial input request.

6. The method of claim 1, wherein the input request is to scroll the document to the target position from an initial position having an initial scale, and the method further comprising:
    identifying another relevant portion of content between the initial position of the document and the target position of the document, the other relevant portion of content comprising a different optimal scale for viewing than the optimal scale for viewing the at least one relevant portion;
    maintaining the initial scale of the document while receiving the initial input request and providing the other relevant portion of content for display, until the target position of the document is provided for display, and
    wherein the position and the scale of the document are adjusted to the adjusted position and scale upon providing the target position of the document for display.

7. A system for optimizing a scale and position of a document in response to a user input, the system comprising:
    a memory comprising a document for display;
    a processor configured to execute instructions to:
        receive an initial input request to scroll the document to a target position of the document;
        identify at least one relevant portion of content at or near the target position of the document;

provide, for display, a visual identification of the at least one relevant portion while receiving the initial input request; and adjust a position and scale of the document during receiving the initial input request to increase visibility or readability of the at least one relevant portion;

receive a further input request to scroll the document by a distance, wherein the further input request is part of a single continuous input with the initial input request, and the single continuous input is a single touch and drag input request; and when the distance of the further input request does not exceed a threshold, maintain the document in the adjusted position and scale during receiving the further input request; and when the distance of the further input request does exceed the threshold, further adjust the adjusted position and scale of the document during the further input request.

8. The system of claim 7, wherein the processor is further configured to provide, for display, graphical feedback when the document is maintained in the adjusted position and scale in response to the further input request.

9. The system of claim 8, wherein the graphical feedback comprises at least one of a shadowing effect, a change of color, a change of gradient, a blinking effect, a stretching effect, or a snapping effect.

10. The system of claim 7, wherein the processor is further configured to provide, for display, a visual identification of the at least one relevant portion while receiving the initial input request.

11. The system of claim 7, wherein the at least one relevant portion of content comprises text, and the processor is further configured to adjust a font size of the text to an optimal reading size for reading the text while receiving the initial input request.

12. A non-transitory machine-readable storage medium comprising machine-readable instructions for causing a processor to execute a method for optimizing a scale and position of a document in response to a user input, the method comprising:

receiving an initial input request to scroll a document to a target position of the document;

identifying at least one relevant portion of content at or near the target position of the document;

adjusting a position and scale of the document during receiving the initial input request to increase visibility or readability of the at least one relevant portion;

receiving a further input request comprising a distance by which to scroll the document from the optimal position, wherein the further input request is part of a single continuous input with the initial input request, and the single continuous input is a single touch and drag input request;

when the distance of the further input request does not exceed a threshold, maintaining the document in the adjusted position and scale during receiving the further input request; and when the distance of the further input request does exceed the threshold, further adjusting the adjusted position and scale of the document during the further input request.

* * * * *

UNITED STATES PATENT AND TRADEMARK OFFICE
CERTIFICATE OF CORRECTION

PATENT NO. : 9,588,675 B2
APPLICATION NO. : 14/058163
DATED : March 7, 2017
INVENTOR(S) : John François Julien Mellor Page 1 of 1

It is certified that error appears in the above-identified patent and that said Letters Patent is hereby corrected as shown below:

On the Title Page

Item (57), IN THE ABSTRACT:
Line 2, "is provided are provided" should read --are provided--.

Signed and Sealed this
Nineteenth Day of November, 2019

Andrei Iancu
*Director of the United States Patent and Trademark Office*